(12) United States Patent
Peters et al.

(10) Patent No.: US 9,185,850 B2
(45) Date of Patent: Nov. 17, 2015

(54) ROTARY BRUSH TURF SWEEPER

(71) Applicants: Michael D. Peters, West Bend, WI (US);
Robert S. Fuller, West Bend, WI (US);
John F. Foyse, Jr., West Bend, WI (US);
Jeffrey L. Scott, Montgomery, IL (US);
Deno J. Minas, Coal Valley, IL (US)

(72) Inventors: Michael D. Peters, West Bend, WI (US);
Robert S. Fuller, West Bend, WI (US);
John F. Foyse, Jr., West Bend, WI (US);
Jeffrey L. Scott, Montgomery, IL (US);
Deno J. Minas, Coal Valley, IL (US)

(73) Assignee: SGM Industries LLC, Montgomery, IL (US)

( * ) Notice: Subject to any disclaimer, the term of this patent is extended or adjusted under 35 U.S.C. 154(b) by 153 days.

(21) Appl. No.: 14/075,226

(22) Filed: Nov. 8, 2013

(65) Prior Publication Data

US 2014/0130275 A1    May 15, 2014

Related U.S. Application Data

(60) Provisional application No. 61/759,743, filed on Feb. 1, 2013, provisional application No. 61/724,766, filed on Nov. 9, 2012.

(51) Int. Cl.
*E01H 1/05* (2006.01)
*A01G 1/12* (2006.01)
*A47L 11/40* (2006.01)

(52) U.S. Cl.
CPC ............. *A01G 1/125* (2013.01); *A47L 11/4058* (2013.01); *E01H 1/056* (2013.01); *Y10T 29/49826* (2015.01)

(58) Field of Classification Search
CPC ....................................................... E01H 1/056
USPC ............................................ 15/50.3, 52.1, 82
See application file for complete search history.

(56) References Cited

U.S. PATENT DOCUMENTS

| 4,034,434 | A | * | 7/1977 | Block | 15/79.1 |
| 6,000,084 | A | * | 12/1999 | Briscoe | 15/49.1 |
| 9,015,888 | B2 | * | 4/2015 | De Bree | 15/82 |
| 2014/0123412 | A1 | * | 5/2014 | De Bree | 15/21.1 |

FOREIGN PATENT DOCUMENTS

GB    1410930    * 10/1975    ............. A47L 11/33

* cited by examiner

*Primary Examiner* — Laura C Guidotti
(74) *Attorney, Agent, or Firm* — Boyle Fredrickson, S.C.

(57) ABSTRACT

A rotary brush turf sweeper includes a frame with a first and second brush carriage supporting a first and second rotary brush. The brush carriages include a first and second carriage bar extending lengthwise along the first and second rotary brush. The brush carriages pivotably attach to the frame by a mounting point on opposing ends of the first brush carriage, allowing the brush carriages to rotate about the attachment point. A brush height adjustment mechanism joins the carriage bars with an electronic actuator. The electronic actuator may be remotely operated to adjust the height of the rotary brushes from a work surface and elevate them so as not to touch the work surface. A first and second drive mechanism transfers rotational force from a pair of drive wheels, so that the rotary brushes always rotate as the device is towed by a vehicle.

11 Claims, 9 Drawing Sheets

ROTARY BRUSH TURF SWEEPER

CROSS-REFERENCE TO RELATED APPLICATION

This application claims a benefit of priority under 35 USC §119 based on provisional patent application No. 61/759,743, filed Feb. 1, 2013, the entire contents of which are hereby expressly incorporated by reference into the present application, and provisional patent No. 61/724,766 filed on Nov. 9, 2012, the entire contents of which are hereby expressly incorporated by reference into the present application.

BACKGROUND OF THE INVENTION

1. Field of the Invention

This invention relates to the field of turf maintenance. In particular, the invention is related to grooming and maintaining the turf and putting greens in golf courses.

2. Discussion of the Related Art

The below-referenced U.S. patent in which the issue fees have been paid, disclose embodiments that were at least, in part, satisfactory for the purposes for which they were intended. The disclosures of the below-referenced prior U.S. patent, in its entirety, is hereby expressly incorporated by reference into the present application for purposes including, but not limited to, indicating the background of the present invention and illustrating the state of the art.

U.S. Pat. No. 7,540,053 discloses a sweeping apparatus which includes a pair of brushes attached to a frame. An additional pair of transport wheels is also attached to the frame and they are manually deployable to elevate the drive wheels and frame. When the transport wheels are deployed, drive wheels do not transfer any rotational force to the brushes.

In embodiments disclosed in the above-referenced patent, the sweeping apparatus may be towed by a vehicle with the transport wheels deployed. The operator may retract the transport wheels allowing the rotary brushes to contact the turf while the sweeping apparatus is moving. Doing so abruptly introduces the brushes, in a static position, to the turf and may potentially cause damage to the turf. During such an occasion, the drive mechanism that transfers rotational force from the drive wheels to the brushes experiences a sudden shock which can cause the chain or belt transferring rotational force to disengage, which requires maintenance of the device. Also, in order to adjust the height of the brushes from the turf, a complex adjusting apparatus must be set at all four corners of the device. Because the adjusting apparatus consists of an infinitely adjustable member at each corner, it is oftentimes difficult to get a precise setting that is the same at all four corners. Any variation between the height settings at each end of a brush causes the brush to not be parallel to the surface of the turf, which also may cause damage to the turf.

What is therefore needed is a turf sweeping device that keeps the brushes in a constant rotational motion whenever the sweeping device is moving. What is also needed is a way to easily set the brush height in a consistent manner to remove any guesswork or measuring. Additionally, a way to remotely adjust the brushes to an elevated position off of the turf, while on the go, is needed.

SUMMARY AND OBJECTS OF THE INVENTION

By way of summary, the present invention is directed to a rotary brush turf sweeper. An object of the invention is to brush up the longer, coarse blades on golf course turf. Brushing the individual blades in the upward direction allows the turf to be mowed more evenly, providing a fine texture to the putting surface and allows the ball to roll on the vertical, cut ends of the turf. The end result is a smoother, faster golf ball roll.

Sweeping the turf with the rotary brushes opens up the turf canopy, allowing light and air to penetrate the soil and mitigate the spreading of diseases in the turf. No physical stress is exerted on the turf during the brushing, even when making multiple passes.

A further object is to completely fill in aeration holes with turf sand. Coarse sand, stones, and other debris may also be brushed off the turf prior to mowing, preventing further damage. The end result is a significantly better performing turf with reduced labor costs. A typical putting green may be swept in ten minutes by one employee.

A rotary brush turf sweeper is herein disclosed. The rotary brush turf sweeper includes a frame that may be constructed with sheet metal but is preferably a tubular design. A first brush carriage supports a first rotary brush. A first carriage bar extends lengthwise along the first rotary brush. The first brush carriage pivotably attaches to the frame by mounting points on opposing ends of the first brush carriage. This attachment allows the first brush carriage to rotate about the attachment point.

A second brush carriage supports a second rotary brush. The second brush carriage pivotably attaches to the frame by mounting points on opposing ends of the second brush carriage, just like the first brush carriage. Just as with the first brush carriage, a second carriage bar attaches to the second brush carriage and extends lengthwise along the second rotary brush.

A brush height adjustment mechanism joins the first and second carriage bars with an electronic actuator. The electronic actuator may be remotely operated to adjust the height of the first and second rotary brushes from a work surface such as the golf course turf. The electronic actuator is operable to change the distance between the first and second carriage bars. The height of the first and second rotary brushes from the work surface increases as the distance between the first and second carriage bars decreases. Likewise, the height of the first and second rotary brushes from the work surface decreases as the distance between the first and second carriage bars increases. The pivoting attachment point of the first and second brush carriages allows for this motion to change the respective heights of the brushes. The electronic actuator directly attaches to one of the first or second carriage bars and attaches to an attachment bracket with a removable fastener, such as a pin on the other carriage bar.

Both of the rotary brush's lowest height from the turf is adjustable. This is accomplished by attaching at least one height adjustment bar that each includes multiple height settings. Preferably, each brush carriage has a height adjustment bar attached to the brush carriages at each corner of the frame on opposing ends of the first and second brush carriages. The height adjustment bars pass vertically through holes in the frame and may travel upwardly and downwardly. The height adjustment bars preferably include multiple holes, each hole corresponding to a lowest height setting of the rotary brush. A stop member is inserted into the desired hole thus setting the lowest height of the respective rotary brush. As the electronic actuator is activated and the carriage bars are pushed further apart from each other, the height of the rotary brushes to the turf is decreased. As the height adjustment bar likewise travels downwardly, the stop member contacts the frame and prevents the rotary brush from lowering further. The stop members may be positioned to prevent contact of one of the rotary brushes with the turf and allow the other rotary brush to contact the work surface. This is desirable when the turf is weak from drought or in early spring.

The frame is moved about with first and second drive wheels that attach to the frame with axles. Only two wheels are used and are centrally located on the frame. A first drive mechanism connects the first drive wheel to the first rotary brush and transfers rotary motion to the first rotary brush whenever the first drive wheel turns. Similarly, a second drive mechanism connects the second drive wheel to the second rotary brush and transfers rotary motion to the second rotary brush whenever the second drive wheel turns.

The first and second drive mechanisms are enclosed by a first guard and a second guard, respectively. A first back plate attaches to the first brush carriage and the first guard frame, sealing the first drive mechanism within and preventing debris from the work surface from entering the first drive mechanism and lubricant, such as oil and grease, from dripping onto the turf. The second drive mechanism likewise includes a second guard enclosing the second drive mechanism with a second back plate and similar function.

The first and second rotary brushes are preferably rigid and cylindrical in shape but may include at least one brush joint on either of the first or second rotary brushes. The joint allows the brush to flex along its respective length and conform to a contour of the turf surface.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DESCRIPTION OF EMBODIMENTS

The present invention and the various features and advantageous details thereof are explained more fully with reference to the non-limiting embodiments described in detail in the following description.

1. System Overview

Lawn sweepers are known devices. It is particularly advantageous to use such lawn sweepers for the removal of debris such as leaves, sticks, and stones. Caring for the turf of the golf course is, however, unique. The greens of a golf course have many requirements that traditional lawn-sweeping devices do not address. For example, sand is typically applied to the greens and must be evenly spread throughout. The complete removal of the sand is not desirable. Specialized brushes are used to evenly spread the sand about and fill in holes that are created during an aeration process. It is important to not apply too much pressure to the turf as damage to the grass may result.

The rotary brush turf sweeper described herein allows a single maintenance person to effortlessly groom golf course turf, in particular the greens, with minimal time. The rotary brush turf sweeper allows such a maintenance person to quickly and easily set the height of a pair of rotary brushes. The rotary brushes may also be elevated off the turf surface remotely while on the go. Height adjustment bars and stopping members with the use of an electronic actuator allow for the minimum height of the rotary brushes to be easily set. In other words, the lowest distance between the rotary brushes and the turf may be quickly and consistently set by inserting stop members through holes of the height adjustment bars. The stop members prevent the rotary brushes from being lowered beyond the desired height.

The rotary brush turf sweeper also includes a pair of brush carriages that support the rotary brushes. The brush carriages pivot about the axles of a single pair of drive wheels allowing the electronic actuator to be remotely controlled and adjust the distance of the rotary brushes to the turf.

In certain weather conditions, such as times of drought, or when the turf is particularly unhealthy and exposed to disease, the height adjustment bars of one of the brushes may be set so that only a single rotary brush contacts the turf. Such a setting allows for minimal pressure to be applied to the turf while still allowing for quick and simple grooming of the greens.

Large drive wheels with a very wide tread pattern may also be employed to spread out the weight of the rotary brush turf sweeper so that only minimal pressure is applied to the turf.

2. Detailed Description

The present invention and the various features and advantageous details thereof are explained more fully with reference to the non-limiting embodiments described in detail in the following description.

Figure 1:
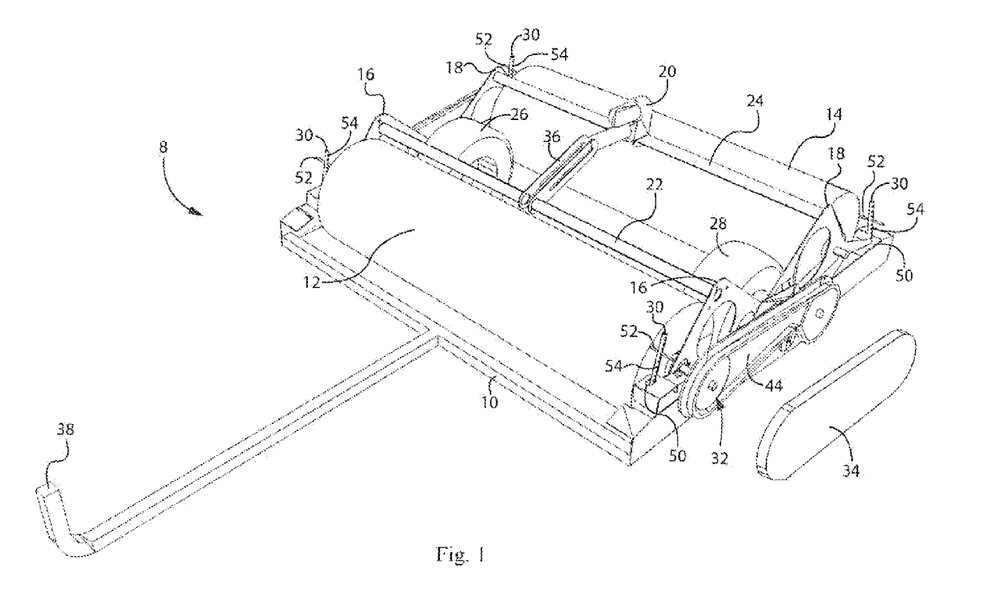
FIG. 1 illustrates an isometric view of the left side of a rotary brush turf sweeper according to the present invention.

A rotary brush turf sweeper 8 is shown in FIG. 1. The rotary brush turf sweeper 8 may be used anywhere that turf grooming is required. For example, golf courses require meticulous grooming of the turf. Putting greens in particular require constant attention by maintenance staff. The rotary brush turf sweeper 8 may be utilized to minimize the amount of time and staff necessary for the upkeep of the turf. A motorized cart or tractor (not pictured) may tow the rotary brush turf sweeper 8 by attaching the hitch mechanism 38 to the rear end of the motorized cart. The rotary brush turf sweeper 8 is not powered or motorized and thus relies on the motorized cart for movement via the hitch mechanism 38.

A frame 10 supports the components of the rotary brush turf sweeper 8 and attaches to the hitch mechanism 38. The frame 10 may be constructed out of a metal or alloy, such as steel or aluminum. The frame 10 may also include tubular members that are connected with fasteners or permanently welded together. Alternatively, the frame 10 may even be comprised of synthetic materials, such as plastic. Preferably, the frame 10 is constructed out of a mix of tubular steel and bent sheet-metal steel that is welded together. The additional components that make up the rotary brush turf sweeper 8 may then be removably attached to the frame 10 with the use of fasteners.

A pair of drive wheels, first drive wheel 28, and second drive wheel 26 each connects to the frame 10 with a separate axle. The first and second drive wheels 28, 26 are always in contact with the turf. The first and second drive wheels 28, 26 allow for the rotary brush turf sweeper 8 to roll along the turf. As the first and second drive wheels 28, 26 are centrally located on the frame 10, the rotary brush turf sweeper 8 may pivot forward and backward about the first and second drive wheels 28, 26. The hitch mechanism 38 prevents this pivoting motion once it is attached to the rear end of a towing vehicle.

The rotary brush turf sweeper 8 includes a first rotary brush 12 and a second rotary brush 14. A first brush carriage 16 supports the first rotary brush 12 while a second brush carriage 18 supports the second rotary brush 14. An electronic actuator 20 attaches a second carriage bar 24 to a first carriage bar 22 with an attachment bracket 36. The attachment bracket 36 allows for a smaller and more compact electronic actuator 20 to be utilized; however, a larger electronic actuator may also be used thus eliminating the attachment bracket 36. Electronic actuator 20 may be remotely controlled to pall the first and second carriage bars 22, 24 closer together. This is done in order to lift the rotary brushes 12, 14 off of the turf surface when brushing is not desired. Likewise, the electronic actuator 20 may also be remotely controlled to push the first and second carriage bars 22, 24 farther apart. The movement of the first and second carriage bars 22, 24 causes the first brush carriage 16 and the second brush carriage 18 to pivot about their attachment point to the frame 10 thus lowering the height of the first and second rotary brushes 12, 14 and engaging them with the turf.

The first brush carriage 16 attaches to the frame 10 in a central location of the frame 10. The first brush carriage 16 attaches to each axle of the first and second drive wheels 28, 26 allowing the first brush carriage 16 to pivot about the axle. The first brush carriage 16 also includes a height adjustment bar 30 attached on the ends of the first brush carriage 16. The height adjustment bars 30 are inserted through frame holes 50 in the frame 10 and travel in an upward and a downward direction through the frame holes 50, as the first brush carriage 16 pivots about the axles. The height adjustment bars 30 each have multiple holes 54 that are configured to receive a stop member 52, such as a pin. This stop member 52 determines the minimum height of the first rotary brush 12. As the first brush carriage 16 is rotated about the axles to lower the height of the first rotary brush 12, the stop member 52 will eventually intersect the frame 10 preventing further movement of the first brush carriage 16. The first brush carriage 16 is placed into this position to place the first rotary brush 12 in contact with the turf when brushing is desired. The first brush carriage 16 may also be moved in the opposite direction increasing the height of the first rotary brush 12 from the turf until the first brush carriage 16 contacts the bottom of the frame 10. The first brush carriage 16 is placed into this position to raise the first rotary brush 12 off of the turf surface when brushing not desired.

The second brush carriage 18 functions identically to the first brush carriage 16 and includes similar components. The second brush carriage 18 attaches to each axle of the first and second drive wheels 28, 26 allowing the second brush carriage 18 to pivot about the axle. The second brush carriage 18 also includes a height adjustment bar 30 attached on the ends of the second brush carriage 18. The height adjustment bars 30 are inserted through frame holes 50 in the frame 10 and travel in an upward and a downward direction through the frame holes 50 as the second brush carriage 18 pivots about the axles. The height adjustment bars 30 each has multiple holes 54 that are configured to receive a stop member 52, such as a pin. This stop member 52 determines the minimum height of the second rotary brush 14. As the second brush carriage 18 is rotated about the axles to lower the height of the second rotary brush 14, the stop member 52 will eventually intersect the frame 10 preventing further movement of the second brush carriage 18. The second brush carriage 18 is placed into this position to place the second rotary brush 14 in contact with the turf when brushing is desired. The second brush carriage 18 may also be moved in the opposite direction increasing the height of the second rotary brush 14 from the turf until the second brush carriage 18 contacts the bottom of the frame 10. The second brush carriage 18 is placed into this position to raise the second rotary brush 14 off of the turf surface when brushing not desired.

FIG. 1 shows a first drive mechanism 32 that transfers rotational force from the first drive wheel 28 to the first rotary brush 12. The axle of the first drive wheel 28 includes a cog that is fitted to a chain that transfers rotational motion from the first drive wheel 28 to a cog attached to a shall of the first rotary brush 12. While cogs and chains are the preferred way of transferring rotational force, many other suitable means may be employed such as belts, gears, pulleys, or ally other known devices. A back plate 44 attaches to the first brush carriage 16 and is fitted behind the cogs and a first guard 34 connects to the back plate 44 to enclose the chain and cogs of the first drive mechanism 32 within. The back plate 44 and the first guard 34 prevent debris from the turf from entering the first drive mechanism 32 and also prevent lubrication such as oil or grease from the first drive mechanism 32 from dripping onto the turf. As a result, the connection of the back plate 44 to the first guard 34 is a tight-fitting connection that may use weather stripping or other sealing means to promote such a connection.

Figure 2:
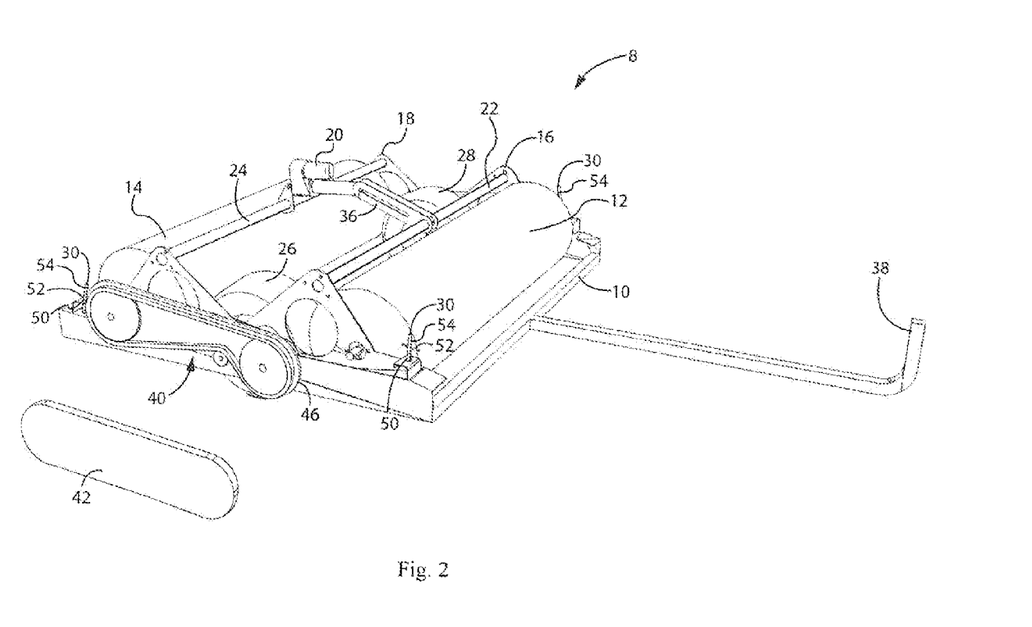
FIG. 2 illustrates an isometric view of the right side of the rotary brush turf sweeper of FIG. 1.

Turning now to FIG. 2, the opposite side of the rotary brush turf sweeper 8, as seen in FIG. 1, is shown. From this side, it is evident that the first drive mechanism 32 only transfers rotational force from the first drive wheel 28 to the first rotary brush 12. A second drive mechanism 40 transfers rotational force from the second drive wheel 26 to the second rotary brush 14. Just as with the first drive mechanism 32 mentioned above, the axle of the second drive wheel 26 includes a cog that is fitted to a chain that transfers rotational motion from the second drive wheel 26 to a cog attached to a shaft of the second rotary brush 14. While cogs and chains are the preferred way of transferring rotational force, many other suitable means may be employed such as belts, gears, pulleys, or any other known devices. A back plate 46 attaches to the second brush carriage 18 and is fitted behind the cogs and a second guard 42 connects to the back plate 46 to enclose the chain and cogs of the second drive mechanism 40 within. The back plate 46 and the second guard 42 prevent debris from the turf from entering the second drive mechanism 40 and also prevent lubrication, such as oil or grease from the second drive mechanism 40, from dripping onto the turf. As a result, the connection of the back plate 46 to the second guard 42 is a tight-fitting connection that may use weather stripping or other sealing means to promote such a connection.

The first and second brush carriages 16, 18 and the back plates 44, 46 that attached to them both rotate about the axles of the first and second drive wheels 28, 26. This maintains a constant drive chain tension in the first and second drive mechanisms 32, 40 throughout the entire travel distance of the first and second brush carriages 16, 18.

Figure 3:
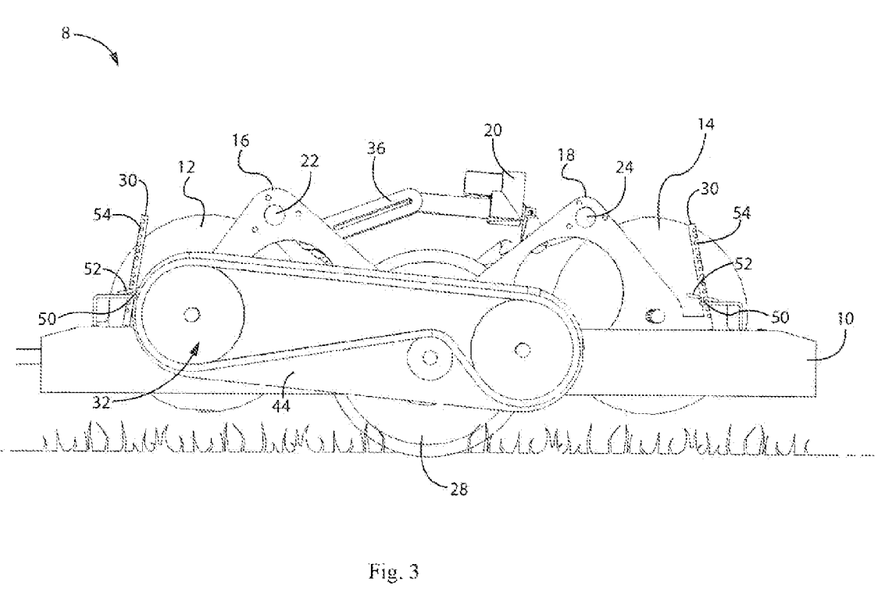
FIG. 3 illustrates a left side view of the rotary brush turf sweeper of FIG. 1.

FIG. 3 shows a side view of the rotary brush turf sweeper 8 exposing the first drive mechanism 32 with the first guard 34 removed from the first brush carriage 16. The first drive wheel 28 is shown resting on the surface of the turf, and the first and second rotary brushes 12, 14 are raised off the turf by thawing the first carriage bar 22 closer to the second carriage bar 24 with the electronic actuator 20. As the first and second carriage bars 22, 24 are drawn closer together, the height adjustment bars 30, which are connected to the first and second brush carriages 16, 18, vertically rise through the frame holes 50 in the frame 10. The stop members 52 may then be placed in the holes 54 in the height adjustment bars 30 to prevent the first and second brush carriages 16, 18 from lowering further in height as the stop members 52 will contact the frame 10 and prevent further lowering.

Positioning the first and second brush carriages 16, 18 in the position shown in FIG. 3 allows a maintenance worker to move the rotary brush turf sweeper 8 while preventing the first and second rotary brushes 12, 14 from contacting the work surface, such as the turf or floor. As the first and second drive wheels 28, 26 remain in contact with the work surface, the first and second drive mechanisms 32, 40 still transfer rotational force to the first and second rotary brushes 12, 14. In other words, the first and second rotary brushes 12, 14 always rotate whenever the rotary brush turf sweeper 8 is towed by a vehicle.

Figure 4:
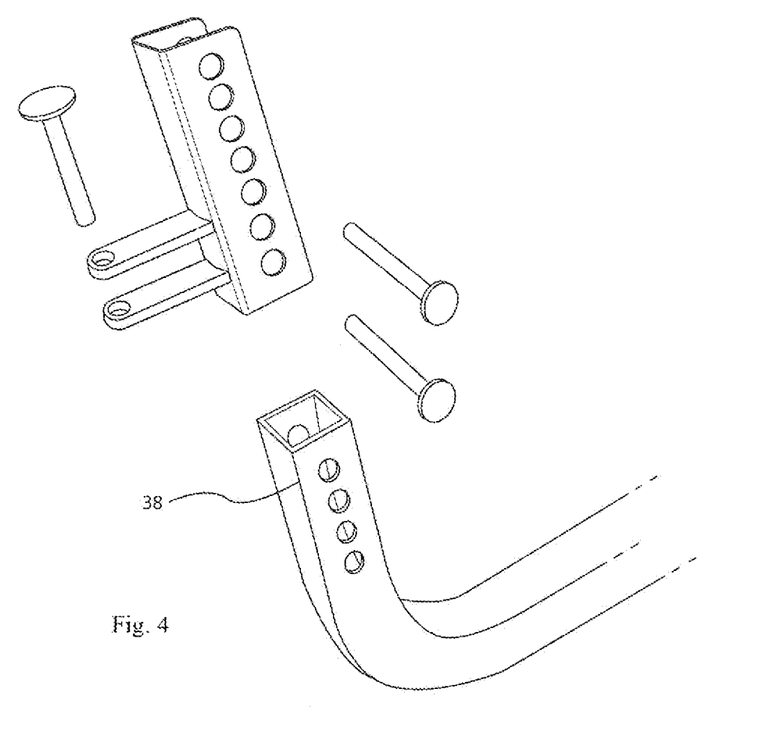
FIG. 4 illustrates an isometric view of a hitch according to one embodiment.
Figure 5:
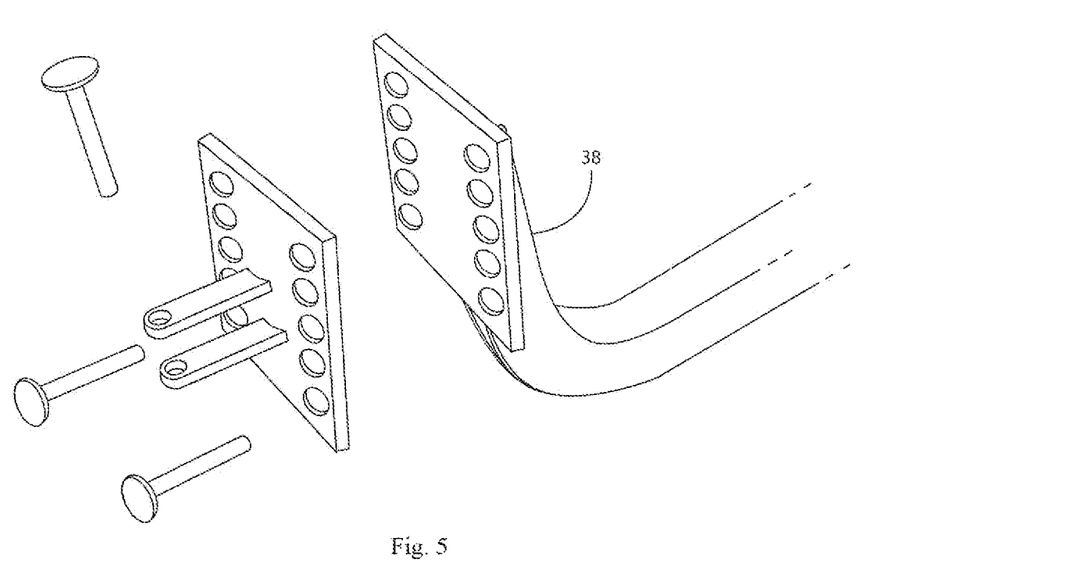
FIG. 5 illustrates an isometric view of another hitch according to another embodiment.

Turning now to FIGS. 4 and 5, the details of two separate embodiments for a hitch are shown. FIG. 4 shows the preferred hitch that includes multiple holes in the hitch mechanism 38 of FIGS. 1 and 2. The hitch mechanism 38 may be attached to a receiving plate with one or more pins. The pins may be inserted through one of the holes in the hitch mechanism 38 and also through one of multiple holes in the receiving plate. This allows a maintenance person to determine the angle of the frame 10 relative to the surface of the turf. This also allows for different towing vehicles that have different height rear ends to be used and maintain a consistent height of the frame 10 to the turf. The receiving plate of FIG. 4 also includes multiple extensions each having a hole. The multiple extensions are designed to sandwich a hitch on the rear end of the vehicle. The multiple extensions may be fastened to the hitch on the rear end of a vehicle with another pin. This allows the vehicle to make turns and allow the multiple extensions to pivot about the pin thus allowing the rotary brush turf sweeper 8 to be movable like a traditional trailer.

FIG. 5 shows an alternative embodiment of a hitch that includes a flat plate that is attached to the hitch mechanism 38 of FIGS. 1 and 2. The flat plate includes multiple holes that are fastened to a receiving flat plate with a plurality of fasteners. The flat receiving plate may be attached to the rear end of the towing vehicle with similar extensions and functions as discussed above with respect to FIG. 4. The multiple holes on both the receiving plate and the hitch also allows for different towing vehicles that may have different rear end heights to be used while maintaining the desired ride height of the frame 10.

Figure 6:
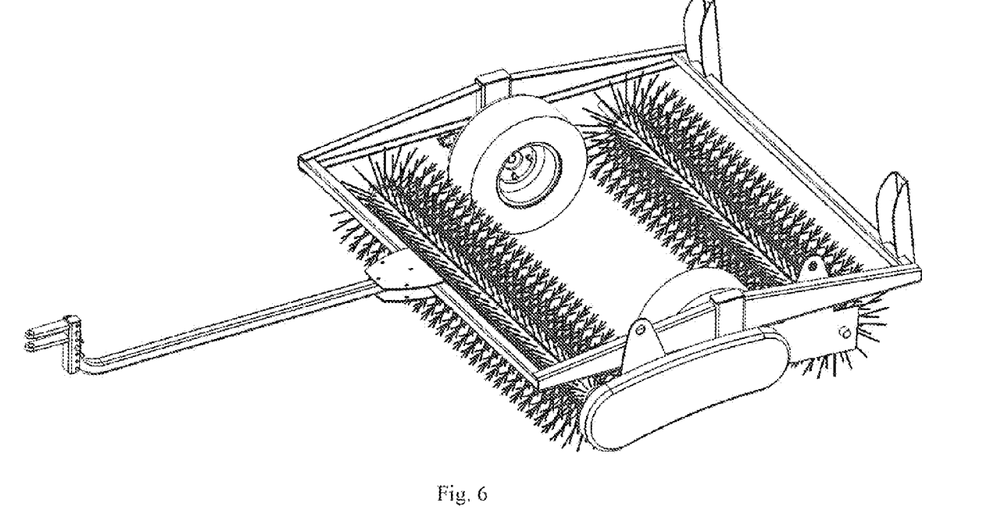
FIG. 6 illustrates an isometric view of an alternative embodiment of a rotary brush turf sweeper.

Turning now to FIG. 6, an alternative embodiment of a rotary brush turf sweeper is shown. One significant difference with the alternative rotary brush turf sweeper is that the frame 10 of FIGS. 1-3 is a hybrid of tubular steel with some sheetmetal reinforcement. The brushes of the alternative rotary brush turf sweeper are also shown in greater detail illustrating the individual filaments of each rotary brush. One other noticeable difference is that the frame sits higher up on the wheel mount. This gives the frame better ground clearance.

Figure 7:
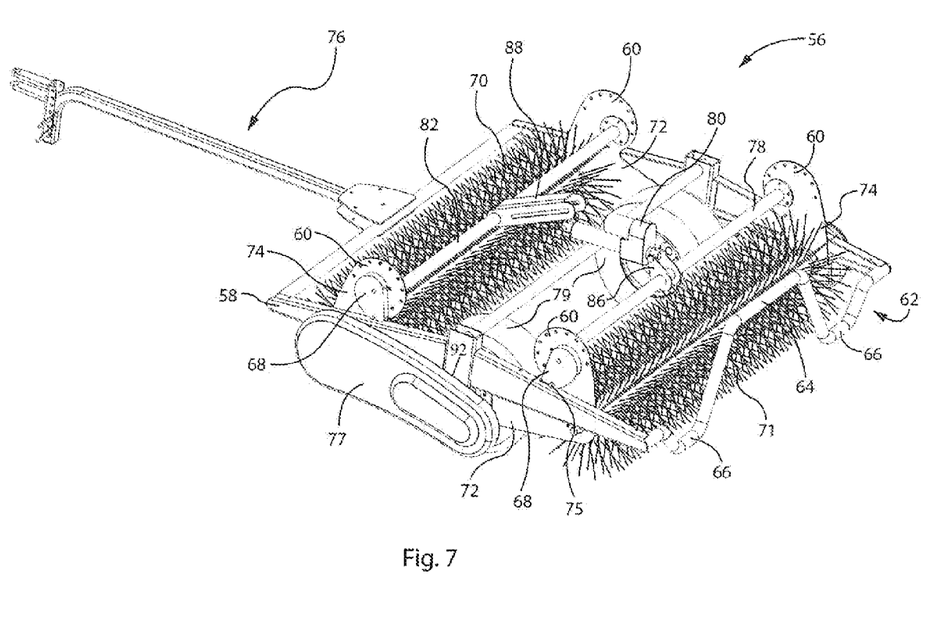
FIG. 7 illustrates an isometric view of an alternative embodiment of a rotary brush turf sweeper.

FIG. 7 shows an alternative rotary brush turf sweeper 56. The alternative rotary brush turf sweeper 56 includes a disc 60 attached at the ends of the first carriage bar 82 and the ends of the second carriage bar 78. Each disc 60 is also attached to a movable cam 68. The cam 68 may be positioned at many different spots on the disc 60 and secured with a pin 75. Each disc 60 attaches and pivots on the centerline of a wheel 79. A wheel centerline connector 72 attaches one of the discs 60 on each carriage bar 82, 78 to the wheels centerline. The opposite disc 60 on each carriage bar 82, 78 attaches to a back plate 92, better seen in FIG. 9, with a back plate connector 74. Since the back plate 92 connects to the wheels centerline, all discs 60 attach and pivot on the centerline of a wheel 79. A guard 77 covers and protects the internal drivetrain from debris when the alternative rotary brush turf sweeper 56 is being used. The guard 77 fully seals and encloses the back plate 92. A gasket material or O-ring may also be used to further seal the guard 77 against the back plate 92. Having a fully enclosed and sealed drivetrain prevents debris from interfering with proper operation and also lowers required maintenance.

In order to raise and lower the first rotary brush 70 and the second rotary brush 71, an actuator 80 attaches to the second carriage bar 78 with an actuator mount 86. The other end of the actuator 80 has an adjustable mount 88 on the first carriage bar 82 and may mount to it at any place along the adjustable mount 88. While the actuator 80 is shown unattached to the adjustable mount 88, it may be attached to the adjustable mount 88. This adjustability allows the user to fine tune the range of motion when raising and lowering the first rotary brush 70 and the second rotary brush 71. Overall, the actuator 80 operates just as with the other embodiments described above.

The frame 58 of the alternative rotary brush turf sweeper 56 is constructed out of a hybrid of tubular steel and welded sheet metal. The use of welded sheet metal provides for a lighter frame 58 and lowers manufacturing costs. The rear portion of the frame 58 includes an integrated stand 62. The stand 62 includes legs 66 and upper portion 64. The stand 62 of the frame 58 allows a user to more easily tilt the alternative rotary brush turf sweeper 56 by lifting the hitch assembly 76. When lifting the hitch assembly 76, the legs 66 of the stand 62 contact the ground and allow the alternative rotary brush turf sweeper 56 to pivot vertically and finally come to rest with the stand 62 on the ground. The stand 62 allows the alternative rotary brush turf sweeper 56 to be conveniently stored in this upright position. The stand 62 may also act as a hanging device to hang the alternative rotary brush turf sweeper 56 on a wall. The upper portion 64 is also elevated to allow a user to pick up the frame 58 without bending down very much, thus minimizing back injuries.

The hitch assembly 76 may also be attached to the frame 58 in three different positions. The hitch assembly 76 may extend at a 45° angle in either the left or right direction. Configuring the hitch assembly 76 in such a manner allows the alternative rotary brush turf sweeper 56 to be towed to the side of the towing device such as a tractor. This allows the first rotary brush 70 and the second rotary brush 71 to groom the turf before the tractor rolls over it. The hitch assembly 76 may also be removed and positioned parallel to the frame 58 for storage or shipping purposes.

Figure 8:
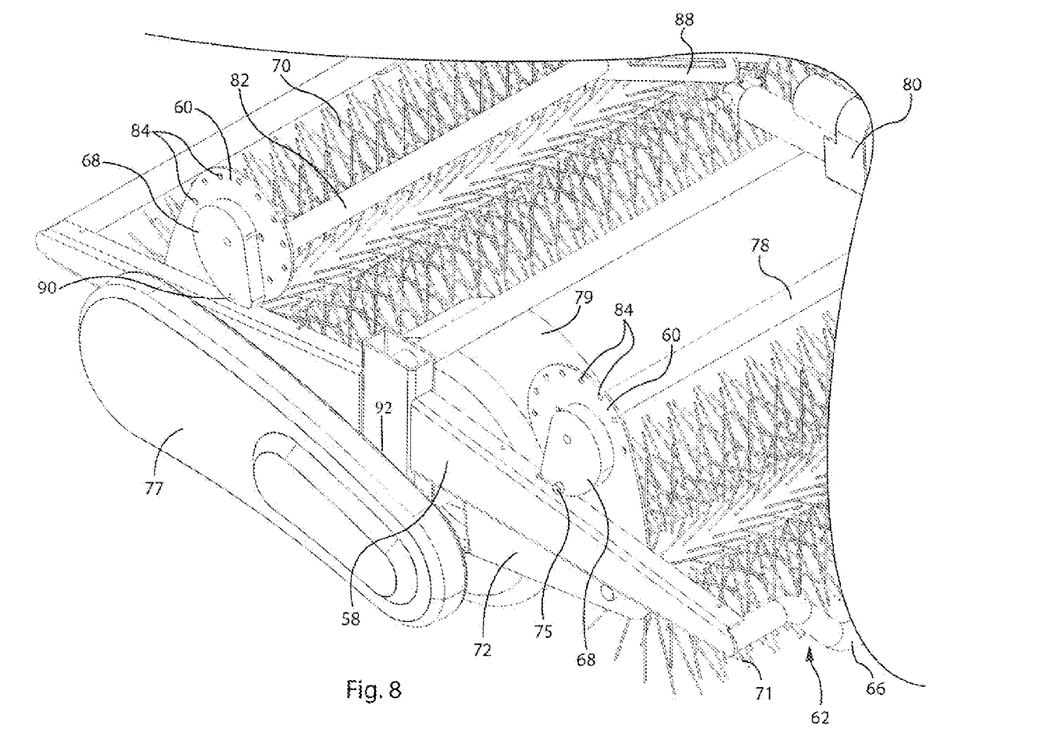
FIG. 8 illustrates a partial isometric view of the rotary brush turf sweeper of FIG. 7.

Turning now to FIG. 8, the detailed operation of raising and lowering the first rotary brush 70 and the second rotary brush 71 will now be explained. Each cam 68 can rotate along the circumference of each disc 60. The exact position of the cam 68 is determined by lining the cam 68 up with an appropriate locking hole 84 on the disc 60 and inserting a pin 75 through the cam hole 90 and also through the locking hole 84 on the disc 60. The position of the cam 68 determines the lowest point that each rotary brush 70, 71 may be set. In other words, as the actuator 80 pushes the first carriage bar 82 away from the second carriage bar 78, the cam 68 will come in contact with the frame 58 and prevents the respective brush from being lowered any further. Since there is a plurality of locking holes 84 on each disc 60, the user has a multitude of choices for setting the lowest position of the rotary brush 70, 71. Such a feature allows the user to raise the height of the rotary brushes 70, 71 by drawing the first carriage bar 82 closer to the second carriage bar 78, with the actuator 80, and raising the first rotary brush 70 and the second rotary brush 71 off the turf. The user may then drive the towing device to haul the alternative rotary brush turf sweeper 56 to the desired grooming location and lower the first rotary brush 70 and the second rotary brush 71, with the actuator 80, until the cams 68 contact the frame 58 and can rest assured that the rotary brushes 70, 71 are not lowered too far, which can damage the turf. Each disc 60 attaches to the centerline of the wheel 79 with either a wheel centerline connector 72 or a back plate connector 74. This ensures the amount each rotary brush 70, 71 is raised or lowered is equal for both rotary brushes 70, 71. It also ensures that the tension on a chain 94, covered by guard 77 and seen in FIG. 9, in the drivetrain remains constant as the rotary brushes 70, 71 are raised and lowered.

Figure 9:
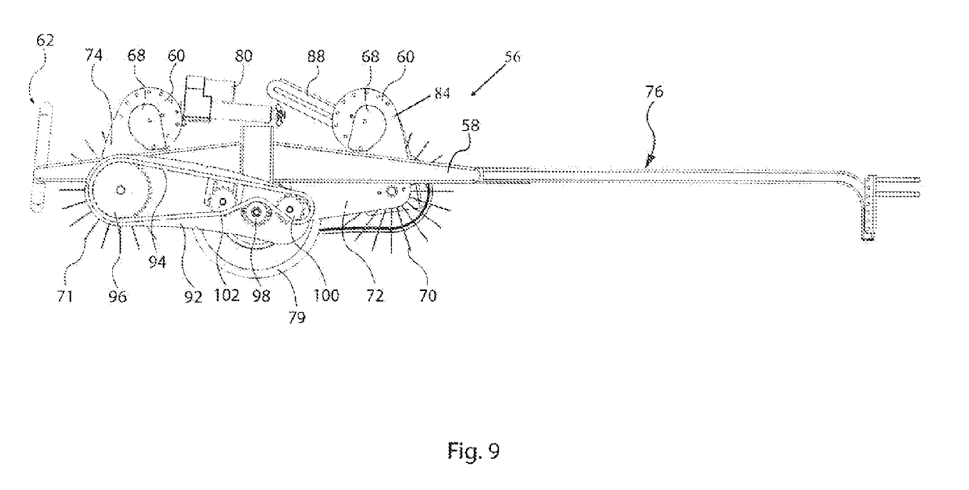
FIG. 9 illustrates a left side view of the rotary brush turf sweeper of FIG. 7.

FIG. 9 shows a side view of the alternative rotary brush turf sweeper 56 with the guard 77 removed, exposing the drivetrain. The drivetrain consists of a wheel gear 98 that is directly attached to and powered by the wheel 79. The wheel gear 98 drives a chain 94 that transfers power to the brush drive gear 96. The brush drive gear 96 is connected to the second rotary brush 71 and drives its rotary motion. An idler gear 100 is fixed to the back plate 92 while an adjustable tension gear 102 may be positioned in place to set the correct chain tension and fastened in place. As mentioned above, each rotary brush 70, 71 pivots about the wheel centerline, which is at the center of the wheel gear 98, which keeps tension constant as the rotary brushes 70, 71 are raised and lowered. A wheel centerline connector 72 attaches one disc 60 to the wheel centerline while a back plate connector 74 attaches the other disc 60 to the back plate 92, which is also attached to the wheel centerline.

The individual components called out herein need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Further, although the components described herein are often described as physically separate modules, it will be manifest that they may be integrated into the apparatus with which it is associated. Finally, all the disclosed features of each disclosed embodiment can be combined with, or substituted for, the disclosed features of every other disclosed embodiment except where such features are mutually exclusive.

As can be seen, it is specifically intended that the present invention not be limited to the embodiments and illustrations contained herein, but includes modified forms of those embodiments, including portions of the embodiments and combinations of elements of different embodiments as come within the scope of the following claims.

What is claimed is:

1. A rotary brush turf sweeper comprising:
   a frame;
   a first brush carriage including a first rotary brush, the first brush carriage pivotably attaching to the frame by a mounting point on opposing ends of the first brush carriage;
   a second brush carriage including a second rotary brush, the second brush carriage pivotably attaching to the frame by a mounting point on opposing ends of the second brush carriage;
   a brush height adjustment mechanism including an electronic actuator connecting the first brush carriage and the second brush carriage configured to adjust the height from a work surface of the first and second rotary brush;
   a first and second drive wheel attached to the frame with axles;
   a first drive mechanism connecting the first drive wheel to the first rotary brush and configured to transfer rotary motion to the first rotary brush when the first drive wheel turns;
   a second drive mechanism connecting the second drive wheel to the second rotary brush and configured to transfer rotary motion to the second rotary brush when the second drive wheel turns; and a first carriage bar attached to the first brush carriage extending lengthwise along the first rotary brush; a second carriage bar attached to the second brush carriage extending lengthwise along the second rotary brush; and the electronic actuator attaching the first carriage bar to the second carriage bar and configured to change a distance between the first and second carriage bars; wherein the height of the first and second rotary brush from the work surface increases as the distance between the first and second carriage bars decreases, and decreases as the distance between the first and second carriage bars increases.

2. The rotary brush turf sweeper of claim 1, further comprising:
   at least one height adjustment bar, each including a multiple height setting, attached to opposing ends of each of the first and second brush carriages; and
   a stop member removably attached to each of the at least one height adjustment bars and configured to attach to one of the multiple height settings of each of the at least one height adjustment bars;
   wherein the height of the first and second rotary brush from the work surface may be lowered until the stop member intersects the frame.

3. The rotary brush turf sweeper of claim 2, further comprising:
   a first guard enclosing the first drive mechanism;

a first back plate attached to the first brush carriage and the first guard preventing a debris from the work surface from entering the first drive mechanism;
a second guard enclosing the second drive mechanism; and
a second back plate attached to the second brush carriage and the second guard preventing a debris from the work surface from entering the second drive mechanism.

4. The rotary brush turf sweeper of claim 2 further comprising:
a multiple height setting on each one of the at least one height adjustment bar, each with a plurality of holes, each one of the plurality of holes corresponding to a predetermined lowest height of the first and second rotary brushes from the work surface; and
a stop member configured for insertion into the plurality of holes.

5. The rotary brush turf sweeper of claim 4, further comprising:
an attachment bracket attached to one of the first and second carriage bars;
the electronic actuator connecting the attachment bracket to the opposite carriage bar of the attachment bracket and configured to removably attach to the electronic actuator;
the stop members configurable to prevent contact of one of the rotary brushes with the work surface and allow the other rotary brush to contact the work surface.

6. The rotary brush turf sweeper of claim 4, further comprising at least one brush joint on the first and second rotary brushes configured to allow the first and second rotary brushes to flex along their respective lengths and conform to a contour of the work surface.

7. A rotary brush turf sweeper comprising:
a tubular frame;
a first brush carriage including a first rotary brush, the first brush carriage pivotably attaching to the frame by a mounting point on opposing ends of the first brush carriage;
a first carriage bar attached to the first brush carriage extending lengthwise along the first rotary brush;
a second brush carriage including a second rotary brush, the second brush carriage pivotably attaching to the frame by a mounting point on opposing ends of the second brush carriage;
a second carriage bar attached to the second brush carriage extending lengthwise along the second rotary brush;
a brush height adjustment mechanism including an electronic actuator connecting the first brush carriage and the second brush carriage configured to adjust the height from a work surface of the first and second rotary brush, the electronic actuator attaching the first carriage bar to the second carriage bar and configured to change a distance between the first and second carriage bars;
wherein the height of the first and second rotary brushes from the work surface increases as the distance between the first and second carriage bars decreases and decreases as the distance between the first and second carriage bars increases.

8. The rotary brush turf sweeper of claim 7, further comprising:

a first and second drive wheel attached to the frame with axles,
a first drive mechanism connecting the first drive wheel to the first rotary brush and configured to transfer rotary motion to the first rotary brush when the first drive wheel turns; and
a second drive mechanism connecting the second drive wheel to the second rotary brush and configured to transfer rotary motion to the second rotary brush when the second drive wheel turns.

9. The rotary brush turf sweeper of claim 8, further comprising:
at least one height adjustment bar, each including a multiple height setting, attached to opposing ends of each of the first and second brush carriages;
a stop member removably attached to each of the at least one height adjustment bars and configured to attach to one of the multiple height settings of each of the at least one height adjustment bars;
wherein the height of the first and second rotary brushes from the work surface may be lowered until the stop member intersects the frame; and
wherein the multiple height setting of each of the at least one height adjustment bars comprises a plurality of holes, each one of the plurality of holes corresponding to a predetermined lowest height of the first and second rotary brushes from the work surface, and the stop member comprises a plurality of pins configured for insertion into the plurality of holes.

10. The rotary brush turf sweeper of claim 8, further comprising:
a first guard enclosing the first drive mechanism;
a first back plate attached to the first brush carriage and the first guard preventing a debris from the work surface from entering the first drive mechanism;
a second guard enclosing the second drive mechanism;
a second back plate attached to the second brush carriage and the second guard preventing a debris from the work surface from entering the second drive mechanism; and
an attachment bracket attached to one of the first and second carriage bars;
wherein the electronic actuator attaches to the opposite carriage bar of the attachment bracket and is configured to adjustably attach to the electronic actuator, the adjustable attachment allowing both or one of the first and second rotary brushes to contact the work surface.

11. The rotary brush turf sweeper of claim 10 further comprising: at least one brush joint on the first and second rotary brushes configured to allow the first and second rotary brushes to flex along their respective lengths and conform to a contour of the work surface;
wherein the multiple height setting of each of the at least one height adjustment bars comprises a plurality of holes, each one of the plurality of holes corresponding to a predetermined lowest height of the first and second rotary brushes from the work surface, and the stop member comprises a plurality of pins configured for insertion into the plurality of holes.

* * * * *